United States Patent [19]

Goodwin et al.

[11] Patent Number: 4,619,911

[45] Date of Patent: Oct. 28, 1986

[54] SORBANT AND PROCESS USING RICE HULL ASH COMPOSITIONS

[75] Inventors: John D. Goodwin; Forrest W. Mulkey, both of Shreveport, La.

[73] Assignee: Molly Maguire, Inc., Shreveport, La.

[21] Appl. No.: 828,137

[22] Filed: Feb. 10, 1986

Related U.S. Application Data

[63] Continuation-in-part of Ser. No. 579,465, Feb. 13, 1984, Pat. No. 4,571,389, which is a continuation-in-part of Ser. No. 460,679, Jan. 24, 1983, Pat. No. 4,488,908.

[51] Int. Cl.$^4$ .......................... B01J 20/04; B01J 20/10
[52] U.S. Cl. .................................................. 502/411
[58] Field of Search .................. 502/411; 501/85, 133, 501/154; 106/75

[56] References Cited

U.S. PATENT DOCUMENTS

| | | | |
|---|---|---|---|
| 1,556,039 | 10/1925 | Shilstone | 502/413 |
| 2,115,973 | 5/1938 | Fleming | 502/401 |
| 4,203,773 | 5/1980 | Temple et al. | 501/85 |
| 4,296,000 | 10/1981 | Wason | 502/411 |
| 4,308,065 | 12/1981 | Walls-Muycelo | 106/75 |

*Primary Examiner*—Mark L. Bell
*Attorney, Agent, or Firm*—Serle Ian Mosoff

[57] ABSTRACT

Disclosed are sorbents and sorbent systems made from lightweight expanded silicate aggregates derived from rice hull ash and processes for sorbing liquids using such sorbents and sorbent systems.

11 Claims, No Drawings

SORBANT AND PROCESS USING RICE HULL ASH COMPOSITIONS

BACKGROUND OF THE INVENTION

A. Related Applications

This application is a continuation-in-part of application Ser. No. 579,465 filed Feb. 13, 1984 which is now U.S. Pat. No. 4,571,389 which in turn is a continuation-in-part of application Ser. No. 460,679 filed Jan. 24, 1983 which is now U.S. Pat. No. 4,488,908.

B. Field of the Invention

The present invention relates to the production and use of sorbants made from lightweight expanded silicate aggregates derived from rice hull ash.

C. Description of the Prior Art

The production of lightweight silicate materials by thermal expansion has been disclosed in the prior art. Such materials find use, among other things, as insulation and fire proofing material, aggregates used in the preparation of concrete, oil adsorbents, and additives for improving soil.

One method for producing a lightweight silicate aggregate is disclosed in Temple et al, U.S. Pat. No. 4,203,773. In general, the process of the Temple et al patent includes the steps of mixing finely divided anhydrous alkali metal silicate with a boron-containing curing agent and water until a homogenous, free flowing powdery composition is attained. The powdery composition is cured to a temperature below about 100° C. until the silicate is hydrated. The hydrated composition is then comminuted and expanded by rapid heating to at least 425° C. to produce the lightweight aggregate. The starting material, i.e. an anhydrous alkali metal silicate, is a highly refined, pure product.

Walls-Muycelo, U.S. Pat. No. 4,308,065 discloses another process for making particulate lightweight porous aggregates. The process of the Walls-Muycelo patent includes preparing an aqueous paste of an alkali metal hydroxide with a mineral containing aluminum oxide, silicon dioxide in mineral form, boric oxide, a volatile material, and an aggregate modifier. The aqueous paste is stirred and the temperature is allowed to be autogenously increased to a temperature of between 70° C. and 80° C. The stirring is discontinued when the temperature remains unaltered for a short period of time and the paste turns into a reaction mass. The reaction mass is dried at a temperature of about 300° C. and then crushed and fired to produce the expanded aggregate.

Additional processes for preparing expanded lightweight silicate aggregates are disclosed in U.S. Pat. Nos. 3,719,510; 3,743,601; 3,765,919; 4,080,187; 3,756,839; 3,728,208; and 3,663,249. In the processes of all of the foregoing patents, the starting materials include pure alkali metal silicates.

Commercially, alkali metal silicates are manufactured by heating a mixture of an alkali compound and silica at about 2700° F. until a technically homogeneous glass is formed, then cooling the alkali metal silicate glass ("water glass") or quenching and dissolving it in water. Alkali metal silicates for general commercial use are manufactured with ratios of $SiO_2$ to $R_2O$ (R=Na,K,Li,Rb,Cs) ranging from 1:1 to 3.75:1, while higher ratios up to 5:1 are less readily dissolved in water, hence of lesser commercial interest.

It is known that rice hulls contain silica. In Blardone, U.S. Pat. No. 1,293,008, there is disclosed a process for extracting silica from rice hulls. For example, Blardone discloses that a concentrated solution of sodium silicate may be extracted from rice hulls by boiling together for a period of from one-half hour to several hours a mixture of 4 or 5 parts by weight of burned rice hulls with 10 parts of water and 1 part of sodium hydroxide. After such period of boiling, the mixture is filtered, with the mass remaining in the filter being washed with water and the filtrate, which is a solution of sodium silicate, being concentrated to the desired degree by further boiling. Another process disclosed by the Blardone patent includes the steps of fusing together 3 or 4 parts of burned rice hulls and 1 part of sodium carbonate, or 8 or 10 parts of burned rice hulls and 3 parts of sodium sulfate. The fused product is then treated with water to extract the sodium silicate, filtered, and the filtrate is evaporated to the required density.

Another patent, which makes use of the fact that rice hulls contain silica is Bieler et al U.S. Pat. No. 3,511,601, which discloses a process for densifying rice hulls. The process of the Bieler et al patent includes coating the rice hulls with an aqueous solution of an alkali metal hydroxide and then burning the coated rice hulls.

It is an object of the present invention to provide a lightweight silicate aggregate prepared from rice hulls without first forming substantially pure alkali metal silicate.

It is a further object of this invention to provide a sorbent for liquids.

It is another object to provide a thermal and acoustic insulating material.

Yet another object is to provide a low cost material which may be used as a refractory, a filler, an energy attenuator, a soil conditioner or as a filter medium.

SUMMARY OF THE INVENTION

Briefly stated, the foregoing and other objects are accomplished by the process of the present invention. The process includes mixing dry rice hull ash, an alkali metal hydroxide, boric acid, and water. The mixture is heated to initiate reaction after which the mixture is cured at a temperature less than the boiling temperature of water until it forms a solid friable mass. The friable mass is comminuted into discrete particles which are expanded by rapid heating to form the expanded silicate aggregate. The aggregate may be used in many different applications as more fully described hereinbelow.

DESCRIPTION OF THE PREFERRED EMBODIMENT

A lightweight expanded silicate aggregate is prepared according to the present invention from dry rice hull ash. Rice hulls are a waste product from rice mills and are normally considered to be of little value. The rice hulls are normally burned at or near the mill and the ash is disposed of. It has been found that by the process of the present invention, rice hull ash can be made into a lightweight expanded silicate aggregate for less than half the cost, on a raw material basis, than that of a lightweight expanded silicate aggregate prepared from anhydrous sodium silicate glass.

Dry rice hulls are known to contain about 20% $SiO_2$, with the remaining composition being primarily cellulose and minor amounts of other combustible materials. When the rice hulls are incinerated, however, to burn the combustible material, the remaining rice hull ash contains in excess of 95% $SiO_2$. It has been found that the rice hull ash used in the process of the present invention should be well burned and should contain less than about 4% by weight of carbon. It has been found that if the carbon content of the ash is higher than about 4%, then the aggregate will not expand satisfactorily.

In the broadest aspect of the invention, the rice hull ash is mixed with an alkali metal hydroxide, boric acid, and water to form a slightly damp powdery composition. More particularly, the dry rice hull ash is mixed in the range of 45% to 70% by weight with 10% to 25% by weight of an alkali metal hydroxide, preferably selected from the group consisting of sodium hydroxide and potassium hydroxide, 10% to 25% by weight of water, and 2% to 4% by weight of boric acid. More preferably, the dry rice hull ash is mixed in the range of 56%–60% by weight with 15%–20% sodium hydroxide, 15%–20% water, and 2%–3% boric acid. In the most preferred embodiment, 62.1% dry rice hull ash and 2.5% boric acid are mixed together with 35.2% by weight of a 50% sodium hydroxide solution.

Preferably, the dry rice hull ash and boric acid are mixed together in dry form in a mixer to which is added a solution formed from the water and the alkali metal hydroxide. The solution of water and alkali metal hydroxide may either be commercially obtained aqueous solution or may be prepared by mixing the dry alkali metal hydroxide with water on site.

The temperature necessary to initiate reaction is about 160° F. The necessary reaction temperature may be achieved either by mixing the dry rice hull ash, boric acid, and alkali metal hydroxide solution all at room temperature and then heating in, for example, an oven until the necessary reaction temperature of 160° F. is reached. Alternatively, the alkali metal hydroxide solution may be heated to a temperature in excess of 160° F. prior to addition to the dry rice hull ash and boric acid. When the heated alkali metal hydroxide solution is added, the reaction proceeds substantially spontaneously. Additionally, when the alkali metal hydroxide solution is prepared on site, the heat of solution when the alkali metal hydroxide and water are mixed is sufficient to elevate the temperature of the solution above 160° F. when the freshly mixed alkali metal hydroxide and water solution is added to the dry rice hull ash and boric acid components the reaction proceeds spontaneously. A minor amount of a silicone fluid emulsion may be added to the mixture prior to reaction. It has been found that the silicone causes the finished material not to absorb water from the air, which is a useful characteristic of the product when used as an insulation.

After the reaction has initiated, the composition is cured until the reaction is complete. The curing may take place either in room temperature or in an elevated temperature oven having a temperature less than the boiling temperature of water. The reaction is in most cases substantially complete in between 30 minutes and 2 hours; however, it has been found that the composition is completely cured in about 24 hours when cured in an oven at 160° F. or in about 48 hours when cured at room temperature.

After the composition has been cured, it forms a solid brittle friable mass. The mass may be broken up by crushing or grinding to form suitably sized discrete particles. Preferably, the particle size is between 8 and 20 mesh. After the particles have been formed, they are expanded in a furnace, or a like, at a temperature of, preferably, between 800° F. and 1000° F. The resulting product is a lightweight material that is insoluble in water, acids, and bases.

The cured composition may be shipped in its unexpanded form to save shipping costs due to the high volume of the expanded material. The cured composition may also be stored in the unexpanded form saving warehouse space until it is needed for current production.

After expansion, the composition has a wide range of uses. Many of the uses fall within the category of thermal or acoustic insulation. Another category of uses is as a sorbent for various materials. Yet another category of uses is as an aggregate in an aggregate-binder system for building panels. The composition may also be used as a refractory, a filler for other materials, an energy attenuator, soil conditioner or filter medium. It will be apparent that the composition will have many other uses as well.

The composition has high thermal and acoustic energy insulation properties. The composition can be used as a loose fill insulation material or it may be combined with a binder system in a sprayable system.

The composition has been found to be particularly useful as a sorbent for a wide variety of liquids. The composition will sorb acids, agricultural chemicals, alcohols and ethers, alkalies, amines, aromatic compounds, chlorinated hydrocarbons, chlorinated solvents, hydrocarbons, ketones, aldehydes and esters, salts, silicates, surfactants, vegetable oils and many other liquids.

The following are exemplary of the liquids that can be sorbed by the compositions of this invention:

| Acids | Agricultural Chemicals |
|---|---|
| Acetic Acid (Glacial) | Bueno ® 6 (Monosodium |
| Boric Acid 6% @ 90° F. | Acid Methanearsenate) |
| Boric Acid 12% @ 140° F. | Dacamine ® (N—Oleyl 1,3- |
| Chlorosulfonic Acid | propylenediamine salt of |
| Chromic Acid, 20% | 2,4-Dichlorophenoxyacetic |
| Chromic Acid, 60% | Acid, 2 lbs./gal.) |
| Formic Acid | Dacamine 4D (N—Oleyl 1,3- |
| Hydrochloric Acid, 38% | propylenediamine salt of |
| Nitric Acid, 71% | 2,4-Dichlorophenoxyacetic |
| Nitric Acid, Fuming | Acid, 4 lbs./gal.) |
| Oleum, Fuming Sulfuric | Daconate ® 6 (Monosodium |
| Phosphoric Acid, 83% | Methylarsenate) |
| Sulfuric Acid, 98% | DSMA (Disodium |
| Alcohols & Ethers | Methanearsenate) |
| Allyl Alcohol | Chlorinated Hydrocarbons |
| Diethyl Ether | Chlorowax LV ® |
| Ethanol | Chlorowax 40 ® |
| Ethylene Glycol | Chlorowax 42-170 |
| Glycerin | Chlorowax 50 ® |
| Isopropanol | Chlorowax 100 |
| Methanol | Chlorowax 500-C |
| Alkalies | PCB (Polychlorinated |
| Ammonium Hydroxide, 30% | Biphenyl) |
| Caustic Potash, 45% | Chlorinated Solvents |
| Caustic Potash, 10% | Carbon Tetrachloride |
| Caustic Soda, 50% | Chloroform |
| Caustic Soda, 10% | Ethylene Dichloride |
| Sodium Methoxide in | Methylene Chloride |
| Methanol, 25% Liquid | Perclene ® D |
| Amines | (Perchloroethylene) |
| Aniline | Triclene ® D |
| n-Butylamine | (Trichloroethylene) |
| Diethylamine | Hydrocarbons |
| Ethylenediamine | Cyclohexane |
| Triethanolamine | Gasoline |
| Triethylamine | Fuel Oil, #2 |
| Aromatics | n-Hexane |
| Benzene | Mineral Spirits |
| Benzonitrile | Motor Oil, SAE #40 |
| Benzoyl Chloride | Ketones, Aldehydes & Esters |
| BTX.(Benzene/Toluene/ | Acetaldehyde |

| -continued | |
|---|---|
| Xylene) | Acetone |
| Chlorobenzene | Amyl Acetate |
| Cresol | n-Butyl Acetate |
| o-Dichlorobenzene | Dioctyl Phthalate (DOP) |
| Ethyl Benzene | Formaldehyde, 37% |
| Nitrobenzene | Methyl Ethyl Ketone |
| Phenol, 84% | Methyl Methacrylate |
| Toluene | Vinyl Acetate |
| Xylene | Miscellaneous |
| Salts | Acetic Anhydride |
| Alum, 50% Liquid | Acrylonitrile |
| Ferric Chloride, 40% | Allyl Chloride |
| Potassium Carbonate, 47% | Bromine |
| Sodium Bichromate, 70% | Carbon Disulfide |
| Sodium Sulfate, (18%) | Epichlorohydrin |
| Silicates | Heat Transfer Liquid |
| Sodium Silicate, | Dowtherm A, Dow Chem. Co. |
| Gr 40 Liq. | Hydrazine Hydrate |
| Sodium Silicate, | (85% Sol.) |
| Gr 52 Liq. | Hydrogen Peroxide, 30% |
| Surfactants | Isophorone |
| Bional ® A-50, Cationtic | MEK Peroxide in |
| (GAF) | Dimethyl Phthalate, 60% |
| Monawet ® SNO-35, Anionic, | Methyl Isocyanate |
| (Mona Industries) | Oil/Water Emulsion, 75% |
| Tergitol ® 15-S-12, Nonionic, | Petroleum Lubricating Oil |
| (Union Carbide) | Phosphatizing Solution |
| Vegetable Oils | Phosphorus Trichloride |
| Corn Oil | PVC Latex (40%) Solids |
| Peanut Oil | Scintillation Liquid |
| Safflower Oil | So-X-1 Scintiverse ™ |
| Soybean Oil | (Fisher Scientific Co.) |
|  | Scintillation Liquid |
|  | (PPO, POPOP, Xylene, |
|  | Napthalene, Dioxane, |
|  | Ethoxyethanol) |
|  | Silane Coupling Agent |
|  | Silicone Emulsion SM 2085 |
|  | General Electric Company |
|  | Silicone Transformer Liquid |
|  | Dow Corning 561 |
|  | Styrene |
|  | Tetrahydrofuran |
|  | Titanium Tetrachloride |
|  | Toluene Diisocyanate |
|  | Water/Oil Emulsion, 5% |
|  | Petroleum Lubricating Oil |
|  | Water Repellent #772, |
|  | Dow Corning |

The sorbents of the present invention sorb many times their own weight of liquid. Generally, they will sorb from about 2 to 10 times their own weight, or more, depending on the specific liquid being sorbed.

Once sorbed, the liquids will be retained by the sorbant allowing easy handling and disposal. The sorbents of this invention are particularly suitable for use in sorbing and disposing of hazardous liquids.

One particularly useful embodiment of this invention is the use of these sorbents to separate hydrophobic/hydrophilic liquid mixtures. The sorbents are treated with a silicone fluid either at the stage of raw material mixing during preparation of the unexpanded particles or in a post treatment of the expanded particles prior to contacting the liquids to be sorbed/separated. The addition is by simple mixing. The silicone treated sorbent will sorb the hydrophobic and hydrophilic components of the liquid at different rates, removing the hydrophobic component more quickly and making the sorbent highly useful in, for example, the cleanup of oil spills on water.

The term "silicone fluid" as used in this application means a synthetic polymer of the general formula $$(R_nSiO_{(4-n/2)})_m$$

where $n = 1-3$ and $m \geq 2$. The silicone contains a repeating silicon-oxygen backbone and has organic groups R attached to a significant proportion of the silicon atoms by silicon-carbon bonds. The R group is preferably methyl; it may be other alkyl or other group. These polymers are commonly combined with additives and/or solvents. In general, any of the commercially available silicone fluids may be used in this invention. Desirable silicone fluids are emulsified siloxane fluids. Preferred are polydimethyl siloxane fluid based emulsions. General Electric silicone emulsion SM 2140 formulated with a 10,000 centistoke polydimethyl siloxane fluid is most desirable. This product can be diluted with water and presents no known fire hazard. It has low toxicity and has no objectionable odors.

The silicone fluid is used in an amount effective to modify the differential hydrophobic liquis sorbing/hydrophilic liquid sorbing characteristics of the sorbent. In general, it is present in an amount in the range of about 0.25%–5%, preferably 0.5%–1.5%, most preferably 0.75%–1.25% by weight of the sorbent.

Another particularly useful embodiment of this invention is the use of the compositions of this invention as sorbents for animal wastes. It is particularly useful in litterboxes for domestic pets, in particular dogs, cats and rodents. Its usefulness may be enhanced in these applications by the addition of odor-covering or odor-reducing additives.

Odor-covering additives include any fragrance or perfume which masks the odor of the animal waste. Any of the commonly used odor-covering additives may be used. The quantity of additive used depends on the amount of animal waste deposited in the sorbent, the duration of use, the location of use and the particular additive used.

Odor-reducing additives are additives which react with the odor causing components and modify them into non-odor causing forms or which prevent odor causing compounds from being formed. Bactericidal enzymes are especially useful in preventing odors caused by bacterial degradation of components of sorbed liquids. A particularly desirable bactericidal enzyme additive is that sold by the Branton Company under the trademark Outright ®.

The amount of odor-reducing additive used depends on the particular additive, the specific odorant and the duration of use of the sorbant. Generally, from about 1 to 15%, preferably about 1.5 to 10% and most desirably about 2 to 5% by weight of odor-reducing additive is used.

The following examples serve to illustrate the practice of the invention.

EXAMPLE 1

79 parts by weight of dry rice hull ash and 4 parts by weight of boric acid were mixed in a dry mixer. 56 parts by weight of a commercially obtained 50% by weight solution of sodium hydroxide to which 2% by weight of the sodium hydroxide solution of a 50% silicone emulsion were added were heated to 180° F. The heated solution was added to the dry rice hull ash the boric acid mixture and mixed together to form a damp powdery composition. The damp powdery composition was placed in a tub on the floor at room temperature and allowed to cure for 48 hours. After curing, the composition formed a brittle mass which was broken up into particles between 8 and 20 mesh in size. The particles were expanded in a furnace at about 1000° F. The product obtained had a bulk density of 5.804 pounds per cubic foot. The material was insoluble in water, mineral acid, and base and had a pH of 10.4. The material was placed in boiling water and showed no signs of disintegration. Thus, the product of Example 1 was deemed acceptable.

EXAMPLE 2

The procedure of Example 1 was generally repeated except that the 56 parts of the 50% sodium hydroxide solution was added to the mixture of 79 parts dry rice hull ash and 4 parts boric acid at room temperature and the resulting composition was placed in a drying oven at 160° F. for 24 hours during which reaction and curing occurred. The cured composition again was comminuted and expanded. The bulk density of the expanded product of Example 2 was 5.736 pounds per cubic foot. Again, the product was insoluble in water, mineral acids, and bases, and passed the boil test.

EXAMPLE 3

In this example, 1.0 parts of dry rice hull ash, 0.035 parts of CaO, and 0.035 parts of boric acid were mixed together in dry form in a mixer. A sodium hydroxide solution was formed by combining 0.376 parts of anhydrous sodium hydroxide with 0.215 parts of water, with the addition of 2 percent by weight of the sodium hydroxide and water of the silicone fluid. The heat of solution of the sodium hydroxide in the water caused the solution to attain a temperature of 190° F. The hot solution was added to the dry mixture of rice hull ash, calcium oxide, and boric acid and was placed in a drying oven at 160° F. for 24 hours to cure. The cured composition was comminuted and expanded to achieve a bulk density of 6.276 pounds per cubic foot. The expanded product was insoluble in water, mineral acid, and base, and was not subject to disintegration during boiling.

EXAMPLE 4

In this example, the procedure of Example 3 was generally repeated except that the composition formed by mixing the dry rice hull ash, calcium oxide, and boric acid, with the solution formed from anhydrous sodium hydroxide, water, and silicone fluid, was allowed to cure at room temperature for 24 hours, whereupon the cured material was comminuted and expanded. The expanded product had a bulk density of 10.6 pounds per cubic foot, which indicated that the product was not completely cured. However, the expanded product was insoluble in water, mineral acid, and bases, and did not disintegrate when boiled.

EXAMPLE 5

In this example, the process of Example 2 was generally repeated except that the amount of dry rice hull ash was increased by 25%. More specifically, 98.75 parts of dry rice hull ash were mixed with 4 parts of boric acid in a dry mixer. To the dry rice hull ash and boric acid was added 56 parts of 50% sodium hydroxide solution with 3% silicone fluid at room temperature. The resulting composition was placed in an oven at 160° F. for 24 hours, during which time the composition reacted and cured. After curing, the composition was comminuted and expanded. The expanded material had a bulk density of 2.838 pounds per cubic foot, was insoluble, and did not disintegrate when boiled in water.

EXAMPLE 6

In this example, the product was prepared according to the process set forth in Example 5 except that the boric acid was omitted and 3 parts by weight of calcium oxide were included. Thus, in this example, 98.75 parts by weight of dry rice hull ash were mixed with 3 parts by weight of calcium oxide. 56 parts by weight of the 50% sodium hydroxide solution with 3% by weight thereof of silicone fluid were added to the dry rice hull ash and lime at room temperature. The resulting mixture was cured in an oven at 160° F. for 24 hours. The product was then comminuted and expanded. The expanded product had a satisfactory bulk density of 6.000 pounds per cubic foot but disintegrated when boiled in water. Accordingly, the product prepared without boric acid was deemed to be unacceptable.

EXAMPLE 7

In this example, the product was prepared according to the method of Example 6 except that the calcium oxide was omitted. Thus, 98.75 parts by weight of dry rice hull ash were mixed with 56 parts by weight of a 50% sodium hydroxide solution with 3% silicone at room temperature. The mixture was cured in an oven at 160° F. for 24 hours and comminuted and expanded. The expanded product had a very low bulk density of 3.324 pounds per cubic foot but, again disintegrated when boiled in water. Thus, while an expanded product may be obtained without boric acid, such product is not acceptable.

EXAMPLE 8

In this example, 98.75 parts by weight of dry rice hull ash were mixed in a dry mixer with 3 parts by weight of calcium oxide and 4 parts by weight of boric acid. To the dry mixture was added 56 parts by weight of 50% sodium hydroxide solution with 2% silicone fluid at room temperature. The resulting mixture was placed in an oven for 24 hours at 160° F., during which time reaction and curing occurred. After curing, the product was comminuted and expanded. The expanded product had a bulk density of 7.008 pounds per cubic foot, was insoluble, and did not disintegrate when boiled.

EXAMPLE 9

In this example, the process of Example 2 was generally repeated, except that the amount of dry rice hull ash was increased by 50%. Thus, 118.5 parts of dry rice hull ash were mixed in a dry mixer with 3 parts by weight of lime and 4 parts by weight of boric acid. To the dry mixture was added 56 parts by weight of 50% sodium hydroxide solution with 2% silicone fluid at room temperature. The resulting composition was then placed in an oven at 160° F. for 24 hours, during which time reaction and curing occurred. The cured product was comminuted and expanded. The expanded material had a bulk density of 9.300 pounds per cubic foot and did not disintegrate when boiled.

EXAMPLE 10

In this example, the amounts of dry rice hull ash was increased by 75% over that of Example 2. More specifically, 138.25 parts by weight of dry rice hull ash were mixed in a dry mixer with 3 parts by weight of lime and 4 parts by weight boric acid. To the dry mixture was added 56 parts by weight of 50% sodium hydroxide solution with 2% silicone fluid. Again, the resulting mixture was placed in an oven at 160° F. for 24 hours for reaction and curing. The cured product was comminuted and expanded. The expanded product had a bulk density of 12.972 pounds per cubic foot and did not disintegrate when boiled.

EXAMPLE 11

In this example, the amount of dry rice hull ash was decreased by 25% compared to Example 2. Thus, 59.25 parts by weight of dry rice hull ash were mixed in a dry mixer with 3 parts by weight of lime and 4 parts by weight of boric acid. 56 parts by weight of 50% sodium hydroxide solution with 2% silicone fluid were added at room temperature. The resulting mixture was placed in an oven at 160° F. for 24 hours for curing and drying. The cured product was comminuted and expanded. The expanded product had a bulk density of 12.14 per cubic foot and did not disintegrate when boiled. However, the expansion was deemed to be poor due to the wetness of the cured product.

EXAMPLE 12

In this example, urea was added to the sodium hydroxide solution prior to mixing with the dry components. Thus, 79 parts by weight of dry rice hull ash were mixed with 3 parts by weight of lime and 4 parts by weight of boric acid. 4 parts by weight of urea was added to 56 parts by weight of 50% sodium hydroxide solution with 2% silicone fluid and mixed with the dry ingredients. The resulting composition was placed in an oven at 160° F. for 24 hours for reaction and curing. The cured material was comminuted and expanded to achieve a bulk density of 7.581 pounds per cubic foot which did not disintegrate when boiled.

EXAMPLE 13

In this example, the sodium hydroxide solution was prepared by mixing water with anhydrous sodium hydroxide, urea, and the silicone fluid. Thus, 1 part by weight dry rice hull ash was mixed with 0.035 parts by weight of lime and 0.035 parts by weight of boric acid. The sodium hydroxide solution was formed by mixing 0.376 parts by weight of sodium hydroxide with 0.215 parts by weight of water and 0.035 parts by weight of urea, which in turn was mixed with 2% by weight of the solution of the silicone fluid. The heat of solution caused the solution to attain a temperature of 190° F. The sodium hydroxide solution was mixed with the dry components and the reaction was immediate. The composition was then cured for 24 hours in an oven at 160° F. The cured material was comminuted and expanded to attain a bulk density of 6.476 pounds per cubic foot and the expanded product did not disintegrate when boiled.

EXAMPLE 14

In this example, a product was prepared generally according to the method of Example 3, except, that potassium hydroxide was substitute for sodium hydroxide. Thus, 1 parts of dry rice hull ash was mixed in a dry mixer with 0.035 parts boric acid and 0.035 parts lime. A solution was formed by mixing 0.376 parts by weight of potassium hydroxide with 0.215 parts by weight of water with the addition of 2% by weight of the solution of the silicone fluid. The heat of solution caused the solution to attain a temperature of 190° F. The hot solution was mixed with the dry components, which initiated an immediate reaction. The resulting mixture was cured for 24 hours in an oven at 160° F. The cured product was comminuted and expanded with a bulk density of 12.0 pounds per cubic foot. The expanded material did not disintegrate when boiled.

EXAMPLE 15

In this example, the product was prepared according to the process in Example 14, except that the silicone fluid was omitted. The expanded product had a bulk density of 15 pounds per cubic foot and did not disintegrate when boiled.

EXAMPLE 16

Ten (10) grams of the material prepared in Example 1 is placed in a container and two hundred fifty (250) grams of water is added. The mixture is allowed to stand for fifteen (15) minutes, after which the excess water is drained by inverting the container onto an 80 mesh screen. The retained aggregate is allowed to drain for five (5) minutes. The aggregate is then weighed, showing a weight gain of one hundred twenty (120) grams, or a water:aggregate ratio of 12:1.

EXAMPLE 17

The procedure of Example 16 is repeated using animal urine instead of water. The weight gain is one hundred twenty five (125) grams, or a ratio of 12.5:1.

EXAMPLE 18

¼ cubic foot of the material prepared in Example 1 is mixed with one (1) ounce of a bactericidal enzyme ("OUTRIGHT") and placed in a litter box for use by an eight and one half (8½) pound indoor cat. After ten (10) days no odor is noticeable.

EXAMPLE 19

A hydrophobic-oleophilic sorbent is prepared by mixing one hundred (100) grams of the material prepared in Example 1 with one (1) gram of a methyl siliconate emulsion (General Electric SM 2085). The sorbent is placed in a container with an excess of a 50% water-#2 fuel oil mixture and allowed to stand for fifteen (15) minutes, after which the excess liquid is drained as in Example 16. The excess liquid is separated into water and oil phases and each phase weighed. The result is an absorbtion ratio of 6:1 for the fuel oil and a negligible absorbtion of water.

EXAMPLE 20

In this Example an easy and convenient means for cleaning up hazardous liquid spills is devised by packaging the material prepared as in Example 1 in a 1.5 ounce spun bonded polyethylene tube. The material (¼ cubic foot) is placed in the fabric tube (dimensions: 3" diameter×15" long). The sorbent thus sealed in the fabric container is placed into a pan containing an excess of 38% hydrochloric acid. After soaking for fifteen (15) minutes, the sorbent tube is removed, drained for five (5) minutes and weighed for liquid pick up. A ratio of ten (10) pounds of acid is absorbed per pound of sorbent.

We claim:

1. A process for sorbing liquids comprising contacting the liquid to be sorbed with a rice hull ash composition prepared by heating a mixture comprising
   a. from about 45% to about 70% by weight of substantially water free rice hull ash which contains no more than about 4% carbon;

b. from about 10% to about 25% of an alkali metal hydroxide;

c. from about 2% to about 4% boric acid; and d. from about 10% to about 25% by weight of water to a temperature of between about 70° C. and about 98° C. and maintaining the temperature in such range until the mixture becomes a solid mass, comminuting the solidified mass into discrete particles and expanding the discrete particles by rapid heating.

2. The process of claim 1 where the mixture comprises a. from about 56% to about 60% rice hull ash;

b. from about 15% to about 20% alkali metal hydroxide;

c. from about 2% to about 3% boric acid; and d. from about 15% to about 20% water.

3. The process of claim 1 where the expanded discrete particles are mixed, prior to contact with the liquid to be sorbed, with an amount of a silicone fluid effective to modify the differential hydrophobic liquid sorbing/hydrophilic liquid sorbing characteristics of the expanded discrete particles.

4. The process of claim 3 where the silicone fluid is present in an amount of from about 0.25% to about 5% by weight of the expanded discrete particles.

5. The process of claim 3 where the silicone fluid is present in an amount of from about 0.75% to about 1.25% by weight of the expanded discrete particles.

6. The process of claim 1 where from about 0.25% to about 5% by weight of a silicone fluid is added to the mixture prior to heating.

7. The process of claim 1 where the expanded discrete particles are mixed, prior to contact with the liquid to be sorbed, with an effective amount of odor masking additives.

8. The process of claim 1 where the expanded discrete particles are mixed, prior to contact with the liquid to be sorbed, with an amount of bactericidal enzymes effective to prevent bacterial degradation of sorbed liquids.

9. The process of claim 8 where the bactericidal enzymes comprise from about 2% to about 6% by weight of the expanded discrete particles.

10. The process of claim 1 where the expanded discrete particles are placed, prior to contact with the liquid to be sorbed, in a container, which container is permeable to the liquid to be sorbed and which container retains its integrity in the presence of the liquid to be sorbed.

11. A sorbant system comprising a rice hull ash composition prepared by heating a mixture comprising a. from about 45% to about 70% by weight of substantially water free rice hull ash which contains no more than about 4% carbon;

b. from about 10% to about 25% of an alkali metal hydroxide;

c. from about 2% to about 4% boric acid; and d. from about 10% to about 25% by weight of water to a temperature of between about 70° C. and about 98° C. and maintaining the temperature in such range until the mixture becomes a solid mass, comminuting the solidified mass into discrete particles, expanding the discrete particles by rapid heating and placing the cooled particles into a container which container is permeable to the liquid to be sorbed and which container retains its integrity in the presence of the liquid to be sorbed.

* * * * *